United States Patent
Ramaiah (10) Patent No.: US 12,327,571 B2
(45) Date of Patent: Jun. 10, 2025

(54) SYSTEMS AND METHODS FOR DIAGNOSING EQUIPMENT

(71) Applicant: Transportation IP Holdings, LLC, Norwalk, CT (US)

(72) Inventor: Naveenkumar Ramaiah, Bengaluru (IN)

(73) Assignee: Transportation IP Holdings, LLC, Norwalk, CT (US)

(*) Notice: Subject to any disclaimer, the term of this patent is extended or adjusted under 35 U.S.C. 154(b) by 601 days.

(21) Appl. No.: 17/523,297

(22) Filed: Nov. 10, 2021

(65) Prior Publication Data
US 2022/0180890 A1    Jun. 9, 2022

Related U.S. Application Data

(60) Provisional application No. 63/122,312, filed on Dec. 7, 2020.

(51) Int. Cl.
*G10L 25/03* (2013.01)
*G06N 20/00* (2019.01)
*G06Q 10/1093* (2023.01)
*G06Q 10/20* (2023.01)

(52) U.S. Cl.
CPC ........... *G10L 25/03* (2013.01); *G06N 20/00* (2019.01); *G06Q 10/1093* (2013.01); *G06Q 10/20* (2013.01)

(58) Field of Classification Search
CPC ......... G10L 25/03; G10L 25/30; G10L 25/51; G10L 25/24; G06N 20/00; G06N 3/08; G06N 3/084; G06N 3/088; G06Q 10/1093; G06Q 10/20; G06F 18/2411; G06F 18/2414; G06F 18/24147; G06F 18/24155; G06F 18/24323; G06F 18/2415
See application file for complete search history.

(56) References Cited

U.S. PATENT DOCUMENTS

| | | | |
|---|---|---|---|
| 7,228,275 B1* | 6/2007 | Endo | G10L 15/32 704/235 |
| 9,674,328 B2* | 6/2017 | Juneja | G10L 15/22 |
| 10,149,049 B2* | 12/2018 | Moghimi | H04R 1/406 |
| 10,304,475 B1* | 5/2019 | Wang | G01S 3/80 |
| 10,715,528 B1* | 7/2020 | Leblang | H04W 4/02 |
| 2008/0284575 A1 | 11/2008 | Breed | |

(Continued)

OTHER PUBLICATIONS

Examination Report mailed Feb. 21, 2023 for corresponding Australian Application No. 2021273601(6 pages).

(Continued)

*Primary Examiner* — Michael Colucci
(74) *Attorney, Agent, or Firm* — K&L Gates LLP (57) ABSTRACT

A method may include recording operation of equipment to create an audio file, extracting features from the audio file, inputting the extracted features into a machine learning model, and determining with the machine learning model a score indicative of the operation of the equipment. A system may include an audio sensor to record audio of operation of equipment and generate an audio file, and one or more processors. The one or more processors extract features from the audio file, input the extracted features into a machine learning model, and determine with the machine learning model a score indicative of the operation of the equipment.

20 Claims, 5 Drawing Sheets

(56) References Cited

U.S. PATENT DOCUMENTS

| | | | |
|---|---|---|---|
| 2013/0142355 A1* | 6/2013 | Isaac | H04R 5/027 |
| | | | 381/92 |
| 2016/0104480 A1* | 4/2016 | Sharifi | G10L 15/32 |
| | | | 704/254 |
| 2016/0343180 A1 | 11/2016 | Talwar et al. | |
| 2018/0247107 A1 | 8/2018 | Murthy et al. | |
| 2018/0315260 A1 | 11/2018 | Anthony | |
| 2018/0350167 A1 | 12/2018 | Ekkizogloy et al. | |
| 2020/0209112 A1 | 7/2020 | Deivasigamani et al. | |
| 2020/0234517 A1* | 7/2020 | Campanella | G06Q 10/00 |
| 2020/0336396 A1* | 10/2020 | Su | G06N 3/045 |
| 2021/0049444 A1* | 2/2021 | Bielby | G06N 3/088 |
| 2021/0074316 A1* | 3/2021 | Souden | G10L 15/25 |
| 2022/0141599 A1* | 5/2022 | Kohl | H04R 25/554 |
| | | | 381/316 |
| 2023/0368807 A1* | 11/2023 | Liu | G10L 25/30 |

OTHER PUBLICATIONS

Dong, Q. et al, 'Imbalanced Deep Learning by Minority Class Incremental Rectification', IEEE Transactions on Pattern Analysis and Machine Intelligence, vol. 41, Issue 6, Jun. 1, 2019.

Castilllo-Guerra, E., 'Adaptive Threshold estimation for speaker verification systems', The Journal of the Acoustical Society of America, May 9, 2008, vol. 123, Issue 5.

First Examination Report mailed Nov. 23, 2022 for corresponding Australian Application No. 2021273601 (5 bages).

* cited by examiner

SYSTEMS AND METHODS FOR DIAGNOSING EQUIPMENT

CROSS REFERENCE TO RELATED APPLICATION

This application claims priority to U.S. Provisional Application 63/122,312, filed 7 Dec. 2020, the entire disclosure of which is incorporated herein by reference.

BACKGROUND

Technical Field

The disclosed subject matter described herein relates to systems and methods for diagnosing equipment.

Discussion of Art

Equipment, such as parts of vehicles, may be diagnosed to detect parts that may be damaged or in failure mode. The diagnosis may vary depending on the individual conducting the diagnosis, which may lead to inaccurate results. The diagnosis may not take into account previous diagnoses which makes it difficult to determine whether the current diagnosis is correct. If equipment is diagnosed incorrectly as operating as desired, a failure of the equipment may result in the equipment (e.g., a locomotive) breaking down. Conversely, if a part is inspected and incorrectly diagnosed as operating undesiredly, for example by being damaged, defective, or failed, unnecessary replacement of the part results in removal of the equipment from service and additional repair costs.

BRIEF DESCRIPTION

In accordance with one example or aspect, a method may include recording operation of equipment to create an audio file and extracting features from the audio file. The method may include inputting the extracted features into a machine learning model and determining with the machine learning model a score indicative of the operation of the equipment.

In accordance with one example or aspect, a system may include an audio sensor to record audio of operation of equipment and generate an audio file and one or more processors. The one or more processors extract features from the audio file and input the extracted features into a machine learning model. The one or more processors determine with the machine learning model a score indicative of the operation of the equipment.

In accordance with one example or aspect, a method may include recording operation of a component using a recording device to create a file and extracting features from the file to create an extraction file. The method may include inputting the extraction file into a machine learning model and determining with the machine learning model a score indicative of the operation of the component based at least in part on the extraction file.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a device that can diagnose equipment, such as equipment associated with vehicle systems, power-generation systems, and construction equipment. Failure to diagnose equipment that is operating in an undesired manner may result in a failure of the equipment that results in expensive repair along with the equipment being out of service while being repaired. Incorrectly diagnosing equipment that is operating as desired as operating in an undesired manner may result in the equipment being out of service and unnecessary repair.

Diagnosing equipment by sound currently relies on an operator who is familiar with the operation of the equipment being able to recognize undesired operation by listening to the equipment and making a judgment based on experience. Diagnosing the equipment in this manner may not detect undesired operation early enough to prevent failure of the equipment and may lead to inconsistent results based on the experience of various operators. The embodiments described herein provide a way to diagnose equipment based on audio data and image data generated from the audio data by using a machine learning model that is trained to distinguish desired operation from undesired operation and continue to learn and improve its ability to distinguish desired from undesired operation.

While one or more embodiments are described in connection with a rail vehicle system, not all embodiments are limited to rail vehicle systems. Further, embodiments described herein extend to multiple types of vehicle systems. Suitable vehicle systems may include a rail vehicle, automobiles, trucks (with or without trailers), buses, marine vessels, aircraft, mining vehicles, agricultural vehicles, and off-highway vehicles. Suitable vehicle systems described herein can be formed from a single vehicle. In other embodiments, the vehicle system may include multiple vehicles that move in a coordinated fashion. A suitable vehicle system may be a rail vehicle system that travels on tracks, or a vehicle system that travels on roads or paths. With respect to multi-vehicle systems, the vehicles can be mechanically coupled with each other (e.g., by couplers) or they may be virtually or logically coupled but not mechanically coupled. For example, vehicles may be communicatively but not mechanically coupled when the separate vehicles communicate with each other to coordinate movements of the vehicles with each other so that the vehicles travel together (e.g., as a convoy, platoon, swarm, fleet, and the like).

With regard to the equipment or component, suitable examples may include equipment that is subject to periodic diagnosis. In one embodiment, the component may be an engine or a component of the vehicle system. For example, the equipment may be a high-pressure fuel pump for an engine of a locomotive. In another example, the component may be an electrical motor. Rotating equipment, generally, is amenable to diagnosis using the inventive methods.

Figure 1:
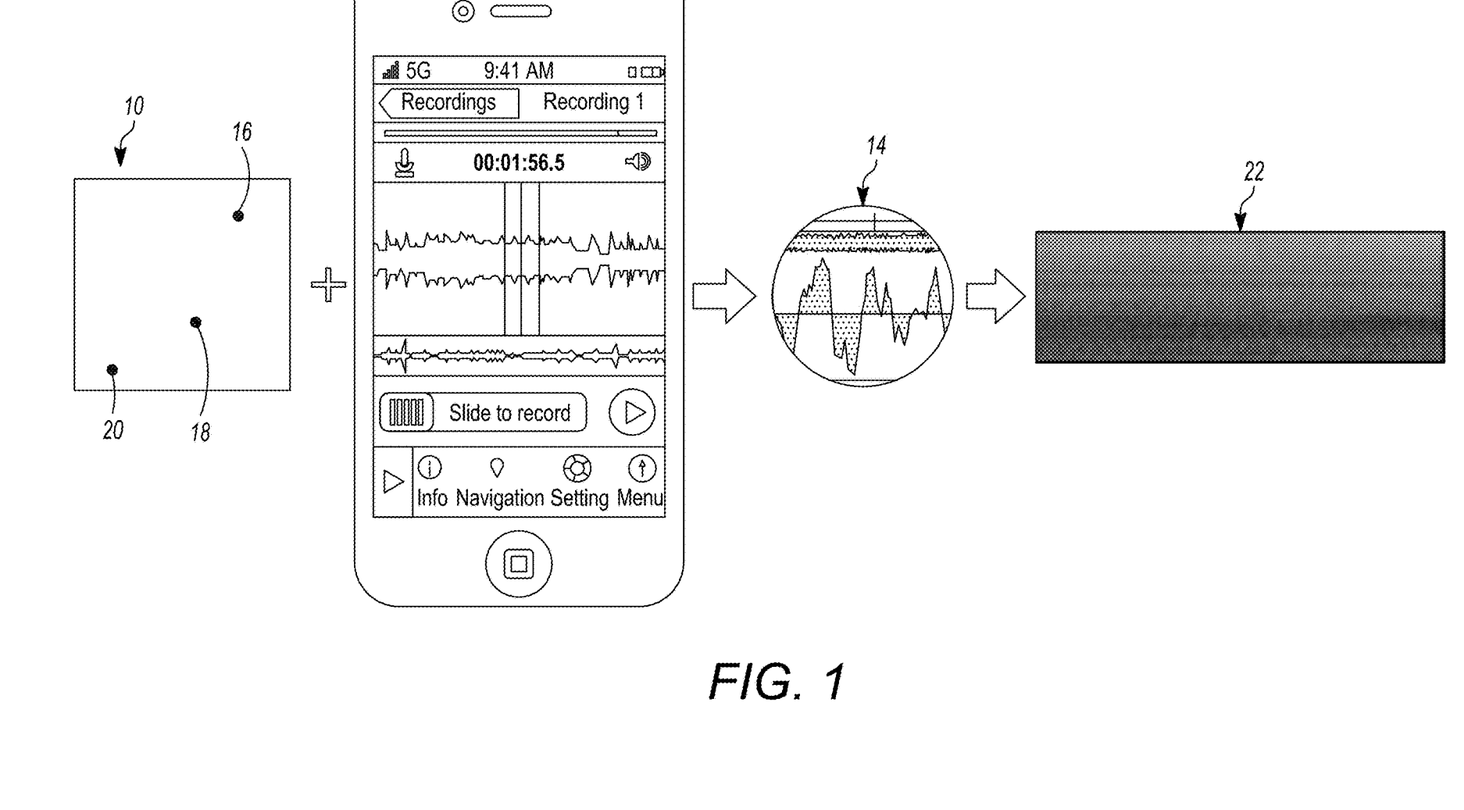
FIG. 1 schematically illustrates a system and method for diagnosing equipment according to one embodiment.

Referring to FIG. 1, a piece of equipment 10 may be diagnosed by an audio recording device 12. According to one embodiment, the audio recording device may be a mobile, handheld device. The audio recording device may be a smartphone or a tablet or a personal digital assistant (PDA) or a laptop computer. The audio recording device includes an audio capture device, e.g., a microphone or an accelerometer or a probe, that captures audio indicative of operation of the piece of equipment or a part of the piece of equipment that is to be diagnosed and store the audio as a raw audio file 14. According to one example, the raw audio file may be a WAV format file. The WAV file may include un-containerized and uncompressed audio data. The audio recording device may be connected to a sensor or a probe or an external microphone, for example by a USB connection. The sensor or probe or microphone may be placed in proximity and/or in contact with the equipment part to generate the raw audio file. The audio recording device may communicate the audio file to one or more processors which may execute instructions stored in a memory to use a machine learning model to make determinations and evaluations regarding the equipment or a part of the equipment. For example, the determination may relate to whether the equipment or the part of the equipment is operating in a desired mode or an undesired mode. With regard to close proximity, the distance may be selected with reference to application specific parameters. In one embodiment, proximity may be within a few inches of the microphone to a portion of the equipment or the part of the equipment.

Suitable audio files may include lossy and non-lossy file types. Example of audio file types may include .wav, .mp3, .wma, .aac, .ogg, .midi, .aif, .aifc, .aiff, .au, and .ea. File type may be selected based at least in part on the compression ratio, compression algorithm, and other application specific parameters.

According to an example, the equipment is a high-pressure fuel pump of a vehicle. The raw audio file may be generated while the locomotive engine is running in an idle (i.e., unloaded) condition. The audio recording device may be placed in close proximity to the high-pressure fuel pump and the audio recording device or the audio capture device may be moved between different locations (e.g., from a first recording location 16, to a second recording location 18, to a third recording location 20, and so on). While the illustrated example shows recording in three locations, optionally, recordings may occur at fewer locations (e.g., a single location or two locations) or more than three locations. As shown in FIG. 1, the recording locations extend from the top to the bottom of the equipment. The audio recording device or audio capture device may be hovered over each of the recording locations for a period of time as the audio recording device or the audio capture device is moved from the first to the second to the third recording location. According to an example, the operation of the high-pressure fuel pump may be recorded for a period of time, for example 30 seconds, one minute, or another length of time. The audio recording device or audio capture device may be used to output two or more audio files. For example, the audio recording device or audio capture device may output a first audio file of a first fuel pump on a first side of a vehicle and may capture a second audio file of a second fuel pump on a second, opposite side of the vehicle.

Figure 2:
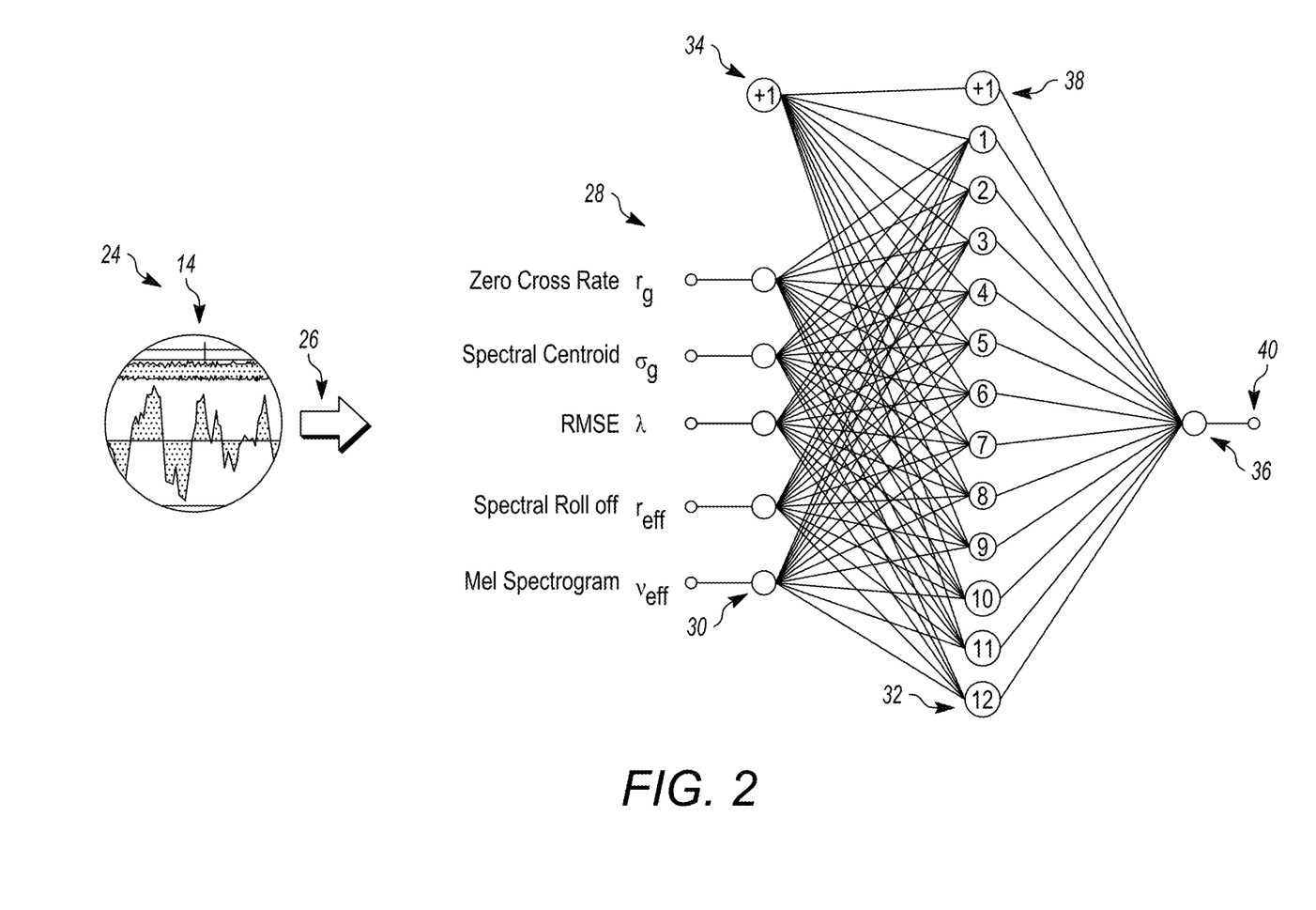
FIG. 2 schematically illustrates a system and method for diagnosing equipment according to one embodiment.

Referring to FIG. 2, a method 24 for diagnosing equipment according to one embodiment includes extracting 26 features from the raw audio file. The features that may be extracted include, but are not limited to, one or more of a zero cross rate, a spectral centroid, a spectral bandwidth, a root mean square error (RMSE), a chroma STFT (short time Fourier transform), or a spectral roll off. The extracted features are input into an input layer 30 of a machine learning model 28. The one or more processors of the audio recording device may transform or convert the raw audio file to image data 22, e.g., a mel spectrogram. The audio data of the audio file may be transformed into the image data of the mel spectrogram using a Fast Fourier Transform (FFT) using, for example a window function having a determined window size. The analysis may use a determined hop size to sample the audio file a determined number of times in between successive windows. The FFT for each window may be computed to transform from the time domain to the frequency domain. The mel scale may be generated by separating the entire frequency spectrum into a determined number of evenly spaced frequencies. The spectrogram may then be generated by, for each window, decomposing the magnitude of the signal into its components, the components corresponding to the frequencies in the mel scale. According to one example, the mel spectrogram may be a 23 feature set.

The mel spectrogram may be input into the input layer with the extracted features. According to an example, the machine learning model includes the input layer, a hidden layer 32, and an output layer 36. As shown in FIG. 2, according to an example, the hidden layer is a single layer and the output layer is a single output neuron. According to other examples, the hidden layer may include multiple hidden layers and/or the output layer may include multiple neurons. In one embodiment, the audio file may be visualized as a wave function. A Fourier Transform may be used for extraction of information from the audio file, the video file, or both. In other embodiments, other transform algorithms may be employed. Suitable transformations models may include Laplace transforms, Wavelet transforms, and Kramers-Kronig transforms.

The algorithm of the machine learning model applies an input bias 34 to the inputs of the hidden layer and directs them through an activation function as the output. According to one embodiment, the algorithm applies an output bias 38 to the output which is provided as an anomaly measure indicative of the operation of the equipment. In one embodiment, the machine learning model is a supervised machine learning model. The machine learning model may be provided with training data that is labeled. The training data may include audio files and image data of the operation of equipment operating in a desired mode and audio files and image data of the equipment operating in an undesired mode. The training data may be from similar equipment, for example from other high-pressure fuel pumps. The training data may be from one or more previous diagnoses of the same equipment. For example, the machine learning model may include previous data of a high-pressure fuel pump and determine that the high-pressure fuel pump has been diagnosed a previous number of times. The machine learning model may include the previous data of the previous diagnoses. The machine learning model may determine that a piece of equipment or a part of a piece of equipment that has been previously diagnosed a certain number of times and determined to be operating in a desired mode may be more likely to be operating in an undesired mode. The machine learning model may also determine from the input data that the equipment being diagnosed is older than other equipment that has been diagnosed and thus determine a degradation of the equipment part over time.

According to an example, the machine learning model may reference results of the model concurrently with the recording of the operation of the equipment to provide more accurate decision making. Referring again to FIG. 1 as the audio recording device is moved from one recording location to another recording location the results at one or more previous recording locations may be used at the next recording location as a concurrent reference point. As the audio recording device or the audio capture device is moved from, for example, cylinder to cylinder in an engine or from cylinder to cylinder in a pump or from pump to pump in the case of multiple pumps, the algorithm of the machine learning model may reference the prior equipment part behaviors and assessments and may adjust the thresholds concurrently with the recording specific to the equipment being diagnosed. The machine learning model may adjust prior assessments of equipment and equipment parts after completion of the evaluation of the entire equipment.

The machine learning model may be stored in a memory of the audio recording device and executed by the one or more processors. The memory of the audio recording device may store the training data and the input data of previous diagnoses, either from diagnoses previously performed by the audio recording device or from other audio recording devices. The input data for the machine learning model is labeled and structured and through operation of the hidden layer the machine learning model detects patterns in the input data and detects any anomaly in the patterns. According to one embodiment, the output 40 of the machine learning model is a single value score indicative of the operation of the equipment on a spectrum of single value scores.

Figure 3:
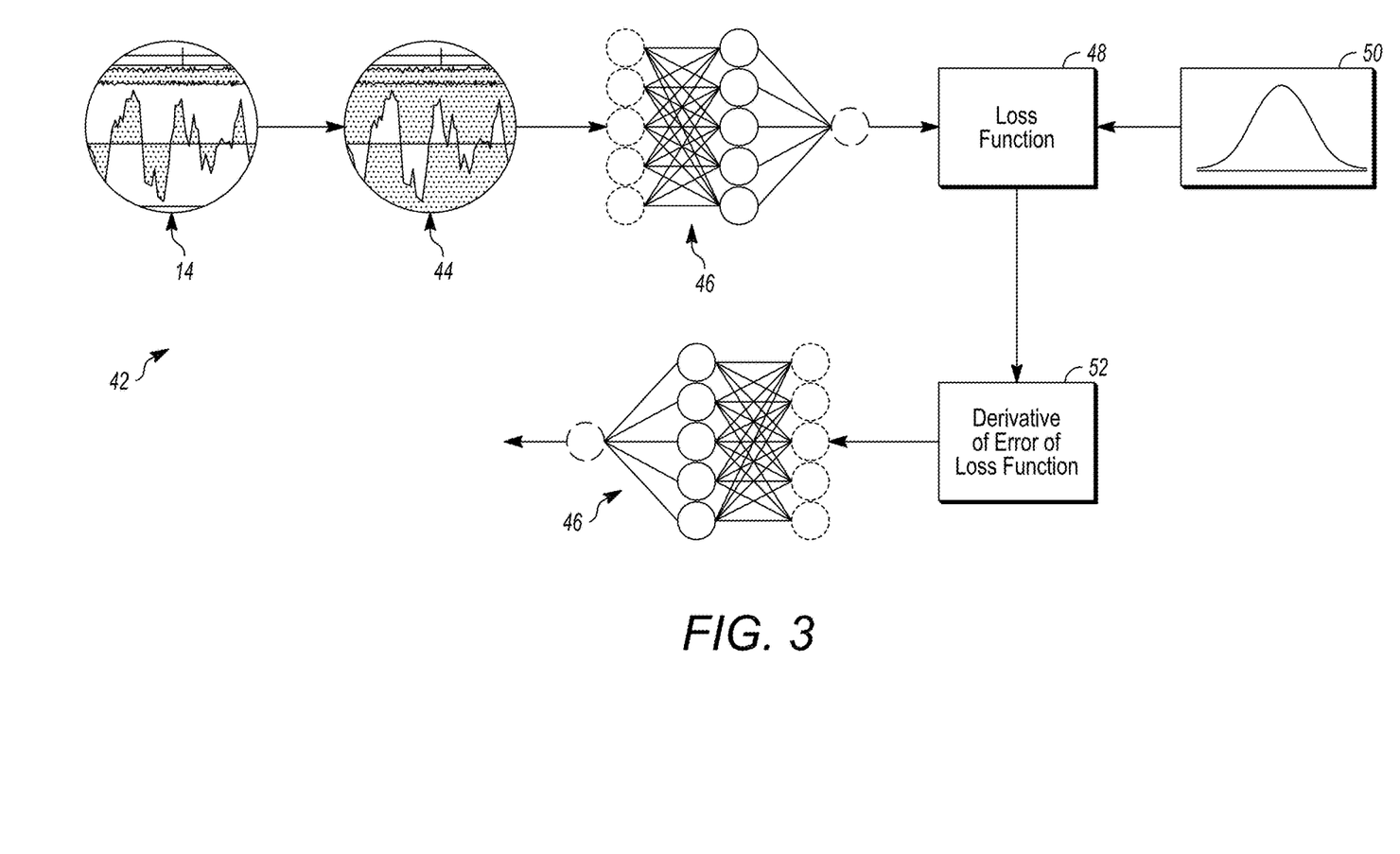
FIG. 3 schematically illustrates a system and method for diagnosing equipment according to one embodiment.

Referring to FIG. 3, a process 42 for diagnosing equipment according to an example includes determining a standard score. The raw audio file is processed into a normalized audio file 44 and features are extracted from the normalized audio file. According to an example, the features that are extracted correspond to the features described with respect to FIG. 2. According to an example, the extracted audio features are provided in a feature set in a comma-separated values format.

The extracted features are input into a machine learning model 46. According to one embodiment, the machine learning model corresponds to the machine learning model described with respect to FIG. 2. The output of the machine learning model is entered into a loss function 48. The loss function determines a maximum likelihood of normal data. The loss function has a scoring component 50 that assigns scores to the data based on a Gaussian distribution.

The scores that are assigned by the loss function are standard scores. Normal data will be assigned standard scores that fall within a range. According to one embodiment, the range is from between −3 to 3. A standard score falling outside of the range is indicative of anomalous data. A standard score with a first range of values may be indicative of operation of the equipment in a desired mode and a standard score with a second range of values may be indicative of operation of the equipment in an undesired mode. According to one embodiment, a standard score within the second range may be higher than a standard within the first range. A derivative of an error determined by the loss function 52 is determined and provided to the machine learning model. The machine learning model learns to fit the data and predict a score which assigns minimum value to normal data and statistically higher value for anomalous data.

Figure 4:
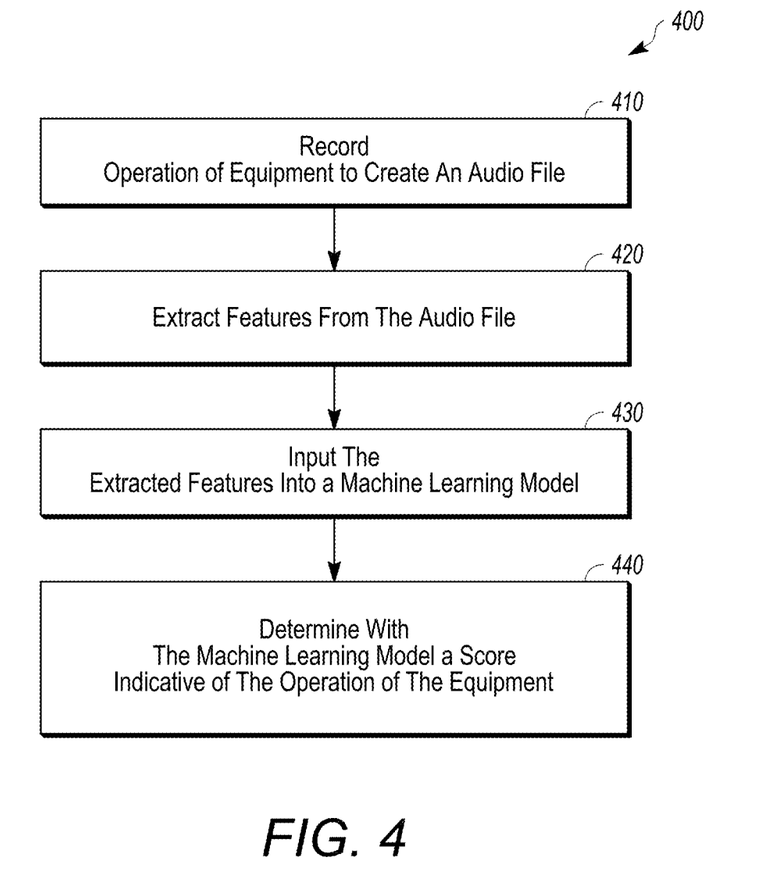
FIG. 4 schematically illustrates a method according to one embodiment.

Referring to FIG. 4, a method 400 may include a step 410 of recording operation of equipment to create an audio file and a step 420 of extracting features from the audio file. The method includes a step 430 of inputting the extracted features into a machine learning model and a step 440 of determining with the machine learning model a score indicative of the operation of the equipment.

Figure 5:
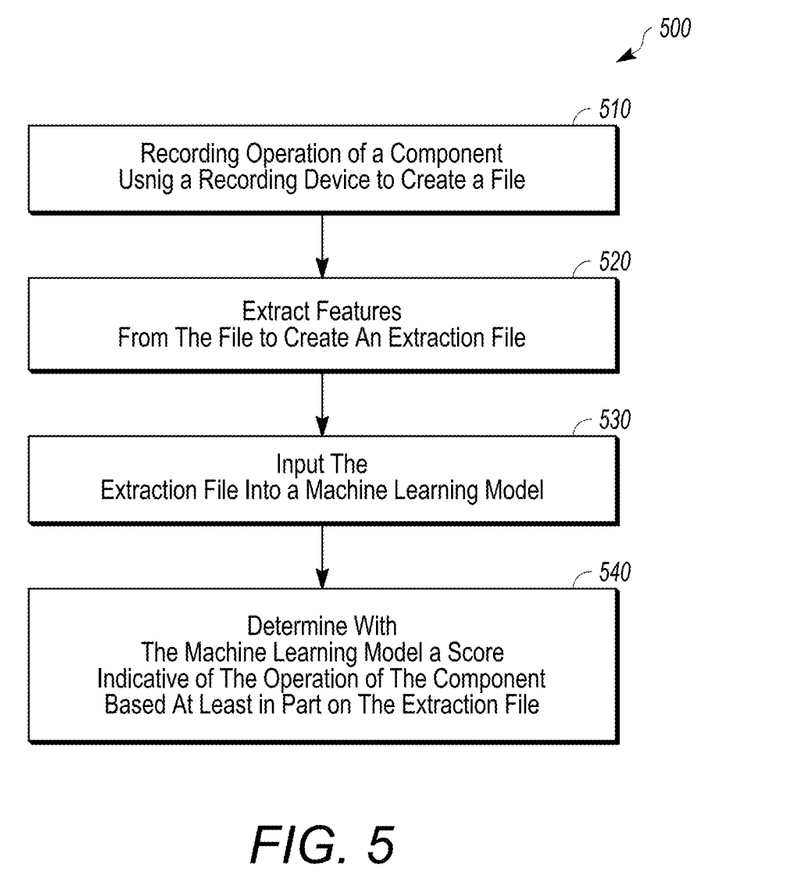
FIG. 5 schematically illustrates a method according to one embodiment.

Referring to FIG. 5, a method 500 may include a step 510 of recording operation of a component using a recording device to create a file and step 520 of extracting features from the file to create an extraction file. The method may include a step 530 of inputting the extraction file into a machine learning model and a step 540 of determining with the machine learning model a score indicative of the operation of the component based at least in part on the extraction file.

A method may include recording operation of equipment to create an audio file and extracting features from the audio file. The method may include inputting the extracted features into a machine learning model and determining with the machine learning model a score indicative of the operation of the equipment.

The method may include generating at least one of a recommendation for modifying operation of the equipment, a request for maintenance of the equipment, and a scheduled future date for conducting a subsequent recording with a notice that the score of the equipment falls within determined acceptable operational parameters.

The machine learning model may include training data including first audio files of desired modes of operation of equipment and second audio files of undesired modes of operation of equipment. The method may include adding the audio file to the training data.

The method may include normalizing data of the audio file prior to extracting the features.

The method may include entering the score into a loss function, and the loss function is based on a gaussian distribution of the features that are extracted and input into the machine learning model.

The score may be a standard score. A standard score within a first range may indicate a desired mode of operation of the equipment and a standard score within a second range may indicate an undesired mode of operation of the equipment.

The features that are extracted from the audio file may include one or more of a zero cross rate, a spectral centroid, a root mean square error, and a spectral roll off The method may include generating image data corresponding to the audio file, inputting the generated image data into the machine learning model concurrently with the recording audio operation, and determining the score based at least in part on the generated image data.

A system may include an audio sensor to record audio of operation of equipment and generate an audio file, and one or more processors. The one or more processors extract features from the audio file, input the extracted features into a machine learning model, and determine with the machine learning model a score indicative of the operation of the equipment.

The one or more processors, using the score, may generate at least one of a recommendation for modifying operation of the equipment, a request for maintenance of the equipment, and a scheduled future date for conducting a subsequent recording with a notice that the score of the equipment falls within determine acceptable operational parameters.

The machine learning model may include training data including first audio files of desired modes of operation of equipment and second audio files of undesired modes of operation of equipment. The one or more processors may add the audio file to the training data.

The one or more processors may normalize data of the audio file prior to extracting the features.

The one or more processors may enter the score into a loss function. The loss function may be based on a gaussian distribution of the features that are extracted and input into the machine learning model.

The score may be a standard score. A standard score within a first range may indicate a desired mode of operation of the equipment and a standard score within a second range indicate an undesired mode of operation of the equipment.

The features that are extracted from the audio file may include one or more of a zero cross rate, a spectral centroid, a root mean square error, and a spectral roll off The extracted features may be video features. The one or more processors may generate image data based at least in part on the extracted features of the audio file, input the generated image data into the machine learning model, and determine the score based at least in part on the generated image data.

Both the audio file and the image data may be concurrently input into the machine learning model.

The component may be at least one of a fuel pump, a water pump, a crank shaft, and a piston.

A method may include recording operation of a component using a recording device to create a file and extracting features from the file to create an extraction file. The method may include inputting the extraction file into a machine learning model and determining with the machine learning model a score indicative of the operation of the component based at least in part on the extraction file.

The extraction files may include audio files, video files, or both audio and video files and the machine learning model may include training data including first reference files of desired modes of operation of the component and second reference files of undesired modes of operation of the component. The method may include adding the extraction file to the training data as either a desired mode of operation or an undesired mode of operation.

In one embodiment, the processors may determine more graduated data about the component. That is, rather than whether it is operating in a desired or undesired state but further the degree to which it is operating in such state. The score may be on a graduated scale, and it may correspond to expected remaining useful life of the component. That information, then, may be used to schedule maintenance, repair or replacement at a future date that is prior to a calculated failure date. The calculated failure date may have margins of error. The margin of error may be determined, on one example, on the criticality of the component and the impact of its failure. In one embodiment, that information may be used to modify operation of the component. For example, if the component is used in less stressful duty cycles it may last longer than if it is used to maximum capability.

In one embodiment, the one or more processors or systems described herein may have a local data collection system deployed and may use machine learning to enable derivation-based learning outcomes. The one or more processors may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used making determinations, calculations, comparisons and behavior analytics, and the like.

In one embodiment, the one or more processors may include a policy engine that may apply one or more policies. These policies may be based at least in part on characteristics of a given item of equipment or environment. With respect to control policies, a neural network can receive input of a number of environmental and task-related parameters. These parameters may include, for example, operational input regarding operating equipment, data from various sensors, location and/or position data, and the like. The neural network can be trained to generate an output based on these inputs, with the output representing an action or sequence of actions that the equipment or system should take to accomplish the goal of the operation. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

Where any or all of the terms "comprise", "comprises", "comprised" or "comprising" are used in this specification (including the claims) they are to be interpreted as specifying the presence of the stated features, integers, steps or components, but not precluding the presence of one or more other features, integers, steps or components.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and clauses, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and clauses, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
   recording audio signals at an audio sensor, wherein the audio signals are associated with operation of equipment, wherein the audio sensor records the operation of the equipment at a plurality of different locations, and wherein the plurality of different locations are relative to the audio sensor and the equipment;
   generating an audio file from the audio signals recorded at the audio sensor at the plurality of different locations;
   extracting features from the audio file;
   inputting the extracted features into a machine learning model; and
   determining with the machine learning model a score indicative of the operation of the equipment, wherein the determining with the machine learning model the score indicative of the operation of the equipment further comprises adjusting by the machine learning model the score at a first location of the plurality of different locations based on the audio signals recorded at a second location of the plurality of different locations.

2. The method of claim 1, further comprising generating, based on the score indicative of the operation of the equipment, at least one of:
   a recommendation for modifying operation of the equipment,
   a request for maintenance of the equipment,
   a scheduled future date for conducting a subsequent recording with a notice that the score of the equipment falls within determined acceptable operational parameters, or
   any combination thereof.

3. The method of claim 1, wherein the machine learning model comprises training data including first audio files of desired modes of operation of the equipment and second audio files of undesired modes of operation of the equipment, the method further comprising:
   adding the audio file to the training data.

4. The method of claim 1, further comprising normalizing data of the audio file prior to extracting the features.

5. The method of claim 1, further comprising:
   entering the score into a loss function, and the loss function is based on a gaussian distribution of the features that are extracted and input into the machine learning model.

6. The method of claim 1, wherein the score is a standard score, and a wherein the standard score within a first range is indicative of a desired mode of operation of the equipment and the standard score within a second range is indicative of an undesired mode of operation of the equipment.

7. The method of claim 1, wherein the features that are extracted from the audio file comprise one or more of a zero cross rate, a spectral centroid, a root mean square error, and a spectral roll off.

8. The method of claim 1, further comprising:
   generating image data corresponding to the audio file;
   inputting the generated image data into the machine learning model concurrently with the audio signals; and
   determining the score based at least in part on the generated image data.

9. A system, comprising:
   an audio sensor;

one or more processors communicably coupled to the audio sensor, wherein the one or more processors is configured to:
- record audio signals at the audio sensor, wherein the audio signals are associated with operation of equipment, wherein the audio sensor records the operation of the equipment at a plurality of different locations, and wherein the plurality of different locations are relative to the audio sensor and the equipment;
- generate an audio file from the audio signals recorded at the audio sensor at the plurality of different locations;
- extract features from the audio file;
- input the extracted features into a machine learning model; and
- determine with the machine learning model a score indicative of the operation of the equipment, wherein the score indicative of the operation of the equipment determined by with the machine learning model further comprises adjustments by the machine learning model to the score at a first location of the plurality of different locations based on the audio signals recorded at a second location of the plurality of different locations.

10. The system of claim 9, wherein the one or more processors generate, based on the score indicative of the operation of the equipment, at least one of:
- a recommendation for modifying operation of the equipment,
- a request for maintenance of the equipment,
- a scheduled future date for conducting a subsequent recording with a notice that the score of the equipment falls within determine acceptable operational parameters, or
- a combination thereof.

11. The system of claim 9, wherein the machine learning model comprises training data including first audio files of desired modes of operation of the equipment and second audio files of undesired modes of operation of the equipment, the one or more processors being further configured to:
- add the audio file to the training data.

12. The system of claim 9, wherein the one or more processors are further configured to normalize data of the audio file prior to extracting the features.

13. The system of claim 9, wherein the one or more processors are further configured to:
- enter the score into a loss function, wherein the loss function is based on a gaussian distribution of the features that are extracted and input into the machine learning model.

14. The system of claim 9, wherein the score is a standard score, wherein the standard score within a first range is indicative of a desired mode of operation of the equipment and the standard score within a second range is indicative of an undesired mode of operation of the equipment.

15. The system of claim 9, wherein the features that are extracted from the audio file comprise one or more of a zero cross rate, a spectral centroid, a root mean square error, and a spectral roll off.

16. The system of claim 9, wherein the extracted features are video features and the one or more processors are further configured to:
- generate image data based at least in part on the extracted features of the audio file;
- input the generated image data into the machine learning model; and
- determine the score based at least in part on the generated image data.

17. The system of claim 16, wherein both the audio file and the image data are concurrently inputted into the machine learning model.

18. A method, comprising:
- recording audio signals at a sensor of a recording device, wherein the audio signals are associated with operation of a component, wherein the sensor records the operation of the component at a plurality of different locations, and wherein the plurality of different locations are relative to the audio sensor and the component;
- generating, by the recording device, a file from the audio signals recorded at the sensor at the plurality of different locations;
- extracting features from the file to create an extraction file;
- inputting the extraction file into a machine learning model; and
- determining with the machine learning model a score indicative of the operation of the component based at least in part on the extraction file, wherein the determining with the machine learning model the score indicative of the operation of the component further comprises adjusting by the machine learning model the score at a first location of the plurality of different locations based on the audio signals recorded at a second location of the plurality of different locations.

19. The method of claim 18, wherein the extraction files include audio files, video files, or both audio and video files and the machine learning model comprises training data including first reference files of desired modes of operation of the component and second reference files of undesired modes of operation of the component, the method further comprising adding the extraction file to the training data as either a desired mode of operation or an undesired mode of operation.

20. The method of claim 18, wherein the component is at least one of a fuel pump, a water pump, a crank shaft, and a piston.

* * * * *